No. 80,259. PATENTED JULY 21, 1868.
G. W. WHITSON.
SELF LOADING CART.
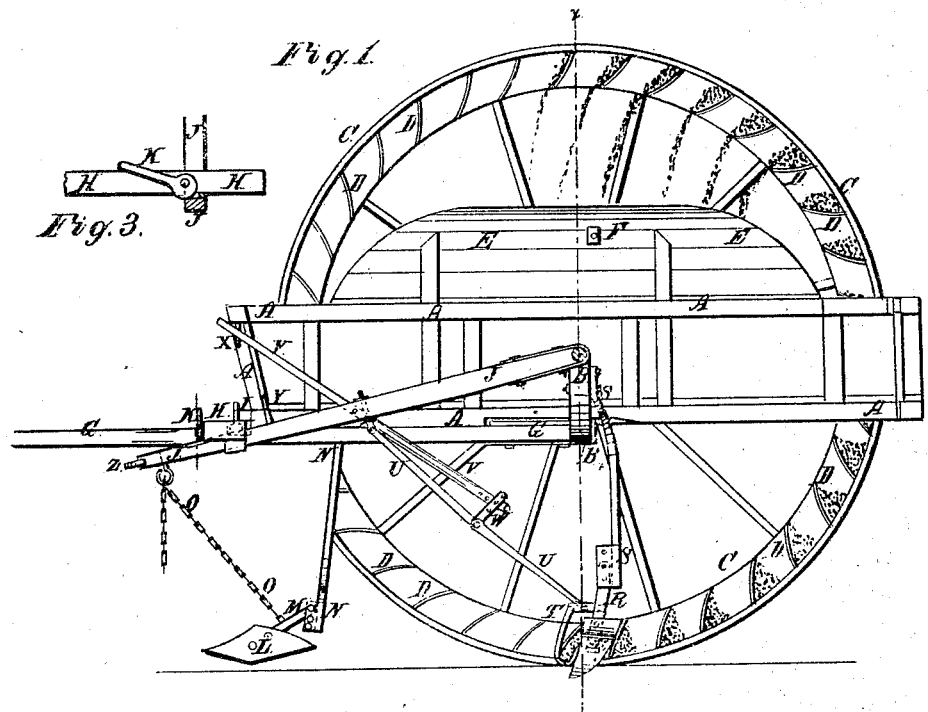
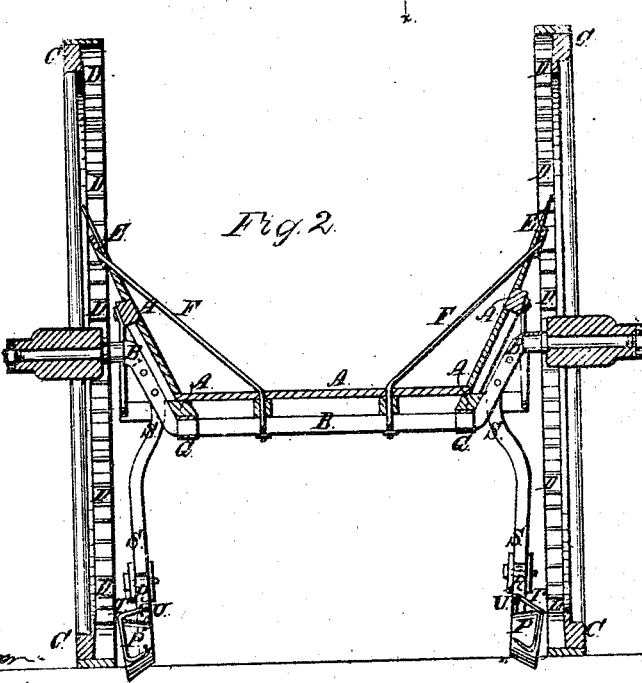

United States Patent Office.

G. W. WHITSON, OF ASHVILLE, NORTH CAROLINA.

Letters Patent No. 80,259, dated July 21, 1868.

IMPROVEMENT IN SELF-LOADING CARTS.

The Schedule referred to in these Letters Patent and making part of the same.

TO ALL WHOM IT MAY CONCERN:

Be it known that I, G. W. WHITSON, of Ashville, in the county of Buncombe, and State of North Carolina, have invented a new and improved Self-Loading Cart; and I do hereby declare that the following is a full, clear, and exact description thereof, which will enable others skilled in the art to make and use the same, reference being had to the accompanying drawings, forming part of this specification.

Figure 1 is a side view of my improved cart, one wheel being removed.

Figure 2 is a vertical section of the same taken through the line $x\,x$, fig. 1.

Figure 3 is a detail view, showing the device for locking the false shafts to the shaft-bar.

Similar letters of reference indicate corresponding parts.

My invention has for its object to furnish an improved cart, which shall be so constructed and arranged as to be self-loading, and which can be easily operated.

And it consists in the construction, combination, and arrangement of the various parts of the cart, as hereinafter more fully described.

A is the body of the cart, which is securely attached to the middle or horizontal part of the axle B.

C are the wheels, which are made straight, and the tires of which are made broad, projecting beyond the felloes upon the inner sides of said wheels.

In the recess thus formed is placed a series of buckets, D, which are securely attached to the sides of the felloes, and which are made of such a form as to raise the earth from the ground as the wheel revolves, and discharge it into the body of the cart. The inner sides of the felloe are made to incline from the tire towards the body of the cart, so as to give the dirt an inward direction or impulse as it leaves the buckets D, and insure its being received by the side boards of the cart-body.

E are side boards, attached to the upper edges of the ordinary side boards of the cart-body, and extending upward and outward, until their upper edges are near the spokes of the wheels, so that they may receive the dirt from the buckets D, and guide it into the cart-body.

F are brace-rods, the upper ends of which are secured to the side boards E, and their lower ends pass through and are secured to the bed-frame of the body A, or to the axle B.

These rods F prevent the side boards E from being pressed outward by the load, and they also, should the axle be sprung downwards by the load, so as to bring the upper parts of the wheels nearer together, draw the said boards inward, so that the side boards E and wheels C may always be kept in their proper relative positions.

G are the shafts, the rear ends of which are pivoted to the axle B, and which are kept in their proper relative positions by the cross-bar H, to which bar the forward end of the cart-body A is detachably secured by a sliding spring-bolt, I, in the ordinary manner, so that the load may be conveniently dumped when desired.

J are false shafts, the rear ends of which are pivoted to the upper parts of the axle B, which pass through keepers attached to the shaft-bar H, and which are detachably secured in place by the cam-levers K, pivoted to the shaft-bar H, and entering notches in the false shafts J to lock said shafts, as shown in fig. 3.

L is a plow, the standard, M, of which is adjustably pivoted to the lower end of the arm or support N, the upper end of which is securely attached to the false shafts J, and which is made of such a shape that the plow L may be held directly in front of the wheel, so as to open a track or furrow for said wheel, the plow L being so formed as to turn the furrow inward, or beneath the body of the cart.

The draught or strain upon the plow L is sustained by the chain O, the rear end of which is attached to the pivoted standard M, and the forward end of which is hooked upon a hook attached to the forward part of the false shafts J, so that the plow L may be supported above the ground, or so as to run at any desired depth.

P is a plow, attached to the standard R, which is adjustably pivoted to the lower end of the arm S, the upper end of which is securely attached to the axle B.

The plow P is made of such a form, and is suspended in such a position, as to throw the dirt turned up by the plow L into the buckets D.

T is a guard, attached to the standard R, and having the same inclination as the plow P, and which is so formed as to prevent stones and other coarse material, which may be of such a size that it could not be carried up by the wheels C, from being forced into the buckets D.

U are toggle-bars, the lower ends of which are pivoted to the standard R, and the upper ends of which are pivoted to the false shaft J.

The joint of the toggle-bars U is adjustably connected to the end of the lever V by the adjustable link or bar W.

The toggle-bars U hold the plow P rigidly in place while being operated, and also enable it to be lifted away from the ground when desired.

The lever V is pivoted to the false shaft J, and its forward end extends forward into such a position as to be easily reached and operated.

The forward end of the lever V is held in place, holding the plow down by a catch, X, attached to the upper part of the cart-body A, and it is held in place, holding the plow raised, by the catch Y, attached to the false shaft J.

The plows P should always be raised before dumping.

Hooks Z may be attached to the ends of the false shafts J, so that two or more horses may be attached to the cart if desired.

I claim as new, and desire to secure by Letters Patent—

1. The combination of the plow P, standard R, support S, axle B, toggle-bar U, lever V, and false shafts J, substantially as described, for the purpose specified.

2. The combination of the toggle-bars U and lever V with the plow-standard R and false shafts J, substantially as herein shown and described, and for the purpose set forth.

3. The combination of the plows L, standards M, arms or supports N, and draught and adjusting-chain O, with the false shafts J and wheels C, substantially as herein shown and described, and for the purpose set forth.

4. The combination of the cam-levers K with the shaft-bar H and false shafts J, substantially as herein shown and described, and for the purpose set forth.

G. W. WHITSON.

Witnesses:
C. COWAN,
R. W. PORTER.